(12) United States Patent
Cholley

(10) Patent No.: US 10,393,358 B2
(45) Date of Patent: Aug. 27, 2019

(54) ROTARY LIGHT MODULE

(71) Applicant: VALEO VISION, Bobigny (FR)

(72) Inventor: Benoit Cholley, Angers (FR)

(73) Assignee: VALEO VISION, Bobigny (FR)

( * ) Notice: Subject to any disclaimer, the term of this patent is extended or adjusted under 35 U.S.C. 154(b) by 165 days.

(21) Appl. No.: 15/581,899

(22) Filed: Apr. 28, 2017

(65) Prior Publication Data

US 2017/0314757 A1 Nov. 2, 2017

(30) Foreign Application Priority Data

Apr. 28, 2016 (FR) ...................... 16 53833

(51) Int. Cl.
| | |
|---|---|
| *B60Q 1/00* | (2006.01) |
| *B60Q 1/076* | (2006.01) |
| *F21S 41/32* | (2018.01) |
| *F21S 41/39* | (2018.01) |
| *F21S 41/19* | (2018.01) |
| *F21S 41/147* | (2018.01) |
| *F21S 43/31* | (2018.01) |
| *F21S 41/675* | (2018.01) |

(Continued)

(52) U.S. Cl.
CPC ............ *F21V 29/70* (2015.01); *B60Q 1/0041* (2013.01); *B60Q 1/076* (2013.01); *F21S 41/141* (2018.01); *F21S 41/32* (2018.01); *F21S 41/39* (2018.01); *F21S 41/675* (2018.01); *F21S 43/14* (2018.01); *F21S 43/31* (2018.01); *F21S 45/40* (2018.01); *F21V 29/89* (2015.01); *F21S 41/147* (2018.01); *F21S 41/19* (2018.01)

(58) Field of Classification Search
CPC .......... F21S 41/675; F21S 41/32; F21S 41/39; B60Q 1/076

USPC ................................................. 362/513, 239
See application file for complete search history.

(56) References Cited

U.S. PATENT DOCUMENTS 7,810,972 B2 * 10/2010 Popelek .............. F21S 48/1757
362/512
7,972,049 B2 * 7/2011 Sugie .................... F21S 41/196
362/545

(Continued)

FOREIGN PATENT DOCUMENTS

| EP | 2 182 274 A2 | 5/2010 |
|---|---|---|
| WO | WO 2014/008523 A1 | 1/2014 |

OTHER PUBLICATIONS

French Preliminary Search Report dated Oct. 20, 2016 in French Application 16 53833 filed on Apr. 28, 2016 (with English Translation of Categories of Cited Documents).

*Primary Examiner* — William N Harris
(74) *Attorney, Agent, or Firm* — Oblon, McClelland, Maier & Neustadt, L.L.P.

(57) ABSTRACT

A light module for a motor vehicle comprises at least one light source capable of emitting light rays, a support bearing the light source, optical deflection elements arranged so as to deflect the light rays emitted by the light source to form a light beam projected at the output of the light module, and guiding elements for guiding the optical deflection elements in rotation about an axis of rotation, in order to shift the projected light beam transversely. According to the invention, the rotation guiding elements comprise a first guiding element borne by the support and configured to cooperate with a second guiding element borne by the optical deflection elements.

19 Claims, 2 Drawing Sheets

(51) Int. Cl.
*F21S 43/14* (2018.01)
*F21S 45/40* (2018.01)
*F21V 29/70* (2015.01)
*F21V 29/89* (2015.01)
*F21S 41/141* (2018.01)

(56) References Cited

U.S. PATENT DOCUMENTS

| | | | |
|---|---|---|---|
| 9,534,756 B2* | 1/2017 | Takahira | F21V 14/00 |
| 9,605,826 B2* | 3/2017 | Cabanne | F21S 41/39 |
| 2002/0064045 A1* | 5/2002 | Sugimoto | B60Q 1/076 362/272 |
| 2007/0147060 A1* | 6/2007 | Chen | B60Q 1/076 362/513 |
| 2009/0034279 A1* | 2/2009 | Blandin | B60Q 1/076 362/512 |
| 2010/0110710 A1 | 5/2010 | Abe | |
| 2015/0204503 A1 | 7/2015 | Krenn et al. | |

* cited by examiner

ROTARY LIGHT MODULE

The invention relates to the field of lighting and/or signaling, notably for a motor vehicle. More particularly, the invention deals with a light module for a motor vehicle, and a light device, notably for lighting and/or signaling comprising such a light module.

Lighting and/or signaling devices can comprise one or more light modules mounted to rotate about an axis, notably to address issues of adaptive lighting. Notably, the document EP 295 74 64 describes a light device, notably for lighting and/or signaling for a motor vehicle, which comprises a housing and a set of at least two light modules, in which at least a part of each light module is mounted to be rotationally mobile about an axis under the effect of an actuator to transversely shift the corresponding light beam at the output of the light module. An associated control device is capable of generating, distinctly for each light module, specific lighting control instructions according to traffic conditions.

The aim of the invention is to propose an improvement to the lighting and/or signaling devices for motor vehicles known from the prior art, notably with regard to the rotational guiding of a light module for a transverse shift of the light beam that it generates.

In this context, the subject of the invention is a light module, notably for a motor vehicle, comprising at least one light source capable of emitting light rays, at least one support bearing said light source, at least one optical deflection element arranged so as to deflect the light rays emitted by the at least one light source to form a light beam projected at the output of the light module, and guiding elements for guiding the optical deflection element in rotation about an axis of rotation, in order to shift the projected light beam transversely.

According to the invention, rotation guiding elements are formed by a first guiding element borne by the support and configured to cooperate with a second guiding element borne by the optical deflection elements.

Transverse shifting of the light beam should be understood to mean that the general orientation of the beam projected at the output of the module, that is to say toward the road scene in front of the vehicle, varies in a plane at right angles to the axis of rotation of the optical deflection elements.

There is thus an assurance, in the vicinity of the light source, that the optical deflection elements rotate accurately about the axis of rotation, notably by virtue of the guiding elements. The invention allows the free rotation of the light module about the axis of rotation up to 360°. According to the invention, the guiding elements are not bulky and require the assembly of a small number of parts, and the benefit of that is notably to reduce the production costs.

The optical deflection elements are rotationally mobile under the effect of an actuator, which can notably comprise an output shaft extending along the axis of rotation and bearing the optical deflection elements.

Advantageously, the actuator and the rotation guiding elements are arranged on either side of the optical deflection elements along the axis of rotation. It will be understood that an cantilever arrangement is thus avoided, in which the part of the optical deflection elements opposite the actuator would tend to be offset from the axis of rotation.

The optical deflection elements can follow a rotation path defined by the guiding elements which thus allow a centering and a good focusing of the light source directed toward the optical deflection elements.

Furthermore, the invention has at least one of the following features, considered in isolation or in combination:
the first guiding element of the light module comprises a guiding track that is at least partially circular and against which the second guiding element can come to bear; "partially circular" should be understood to mean that the guiding track may be broken and may form only a circular arc, or else that it may be closed and take the form of a regular circular track, or even that it may be closed and have a circular part used for the rotation guiding and another part not used for the guiding;
the guiding track is formed at the periphery of a cylindrical boss arranged to protrude from an inner face of the support facing the optical deflection elements;
the light source is arranged on a transverse end face of the cylindrical boss;
the light source is arranged in the vicinity of the center of the circular arc defining the outline of the at least partially circular guiding track;
the guiding track is formed by a face of an annular wall which extends to protrude from an inner face of the support and inside which the light source is arranged;
the second guiding element is added on against the at least partially circular guiding track, corresponding to the first guiding element;
the second guiding element comprises at least one pin secured to the optical deflection elements; the at least one pin is borne by an arm transversely extending the optical deflection elements at their end facing the support;
the at least one pin has a form of revolution about an axis parallel to the axis of rotation;
the second guiding element can comprise three pins;
the light source is a light-emitting diode borne by a first printed circuit board; in a variant of the embodiment, the first printed circuit board can bear several light-emitting diodes;
the support is produced in a heat-conducting metal material, notably aluminum, so as to form a heat sink;
the optical deflection elements can consist of a reflector of substantially elliptical form, the light source being arranged substantially in the vicinity of a first focal point of said reflector.

It will be possible to provide for the optical deflection elements to be mounted to be rotationally mobile about an additional axis of rotation distinct from the first axis of rotation as has just been defined, and notably substantially at right angles to this first axis of rotation, in order to shift, here vertically, the corresponding light beam at the output of the light module. Thus, the light beam is capable of being shifted vertically and/or transversely.

The support thus has the advantageous features of being the bearer of the rotation guiding elements according to a first axis of rotation allowing the transverse shifting of the light beam and/or of being the bearer of a second axis of rotation allowing the vertical shifting of the corresponding light beam at the module output.

According to another series of features, taken alone or in combination with the preceding features, specific to the light source, it will be possible to provide for:
the light source to comprise at least one semiconductor emissive element;
the light source to be a light-emitting diode;
the module to comprise an electrical connection substrate capable of electrically powering the light source;

the connection substrate to be a printed circuit board, a flexible printed circuit board or an interconnection device with variable geometry;

the light source to be arranged on the electrical connection substrate.

The invention relates also to a light device, notably for lighting and/or signaling for a motor vehicle, comprising at least one light module according to the invention, at least one plate and at least one bearing. The device can notably comprise a casing defining, with an enclosing outer lens, a housing for receiving at least one light module. The light beam projected at the output of the light module is configured to pass through this enclosing outer lens before being projected onto the road scene in front of the vehicle. Preferably, this light device comprises three light modules according to the invention. Particularly in this case, and when there are several light modules arranged in a common light device, the light beams projected by each of the modules are configured to form a global light beam, notably meeting the regulatory motor vehicle lighting and/or signaling standards.

Other features and advantages of the present invention will become more clearly apparent in the light of the description and the drawings, in which.

In the following description, a longitudinal, vertical and transverse orientation will, in a nonlimiting manner, be adopted according to the orientation traditionally used in the automobile industry. Furthermore, the terms bottom and top should be interpreted when the object is in the normal position of use.

Figure 1:
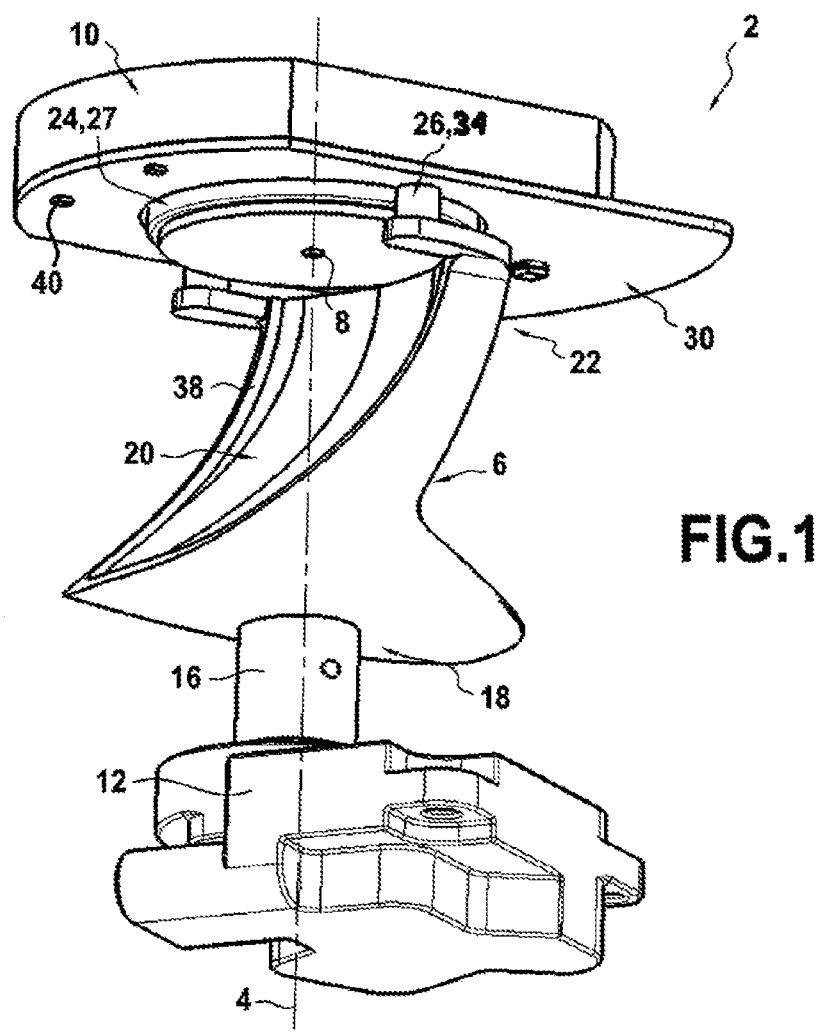
FIG. 1 is a three-quarters perspective view from the front of a light module, according to an embodiment of the invention.
Figure 2:
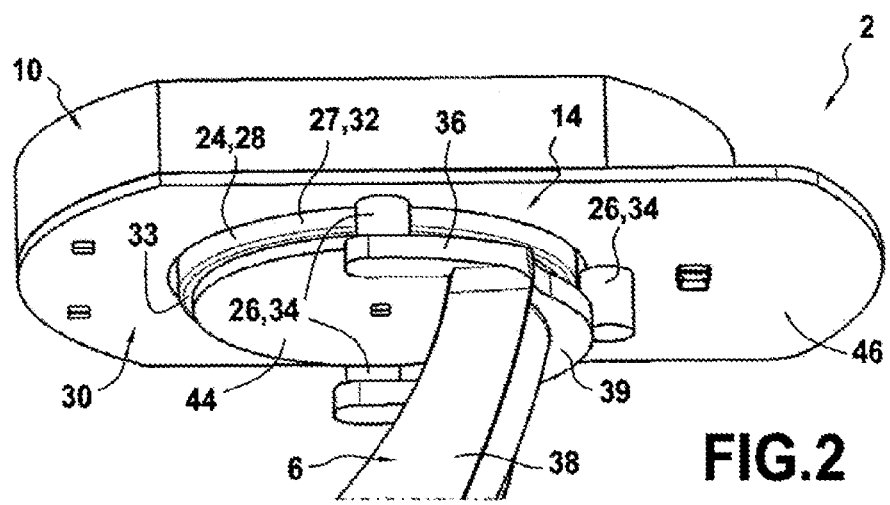
FIG. 2 is a perspective view, from the side, of a detail of the light module represented in FIG. 1.

FIGS. 1 and 2 represent a light module 2 that is rotationally mobile about an axis of rotation 4.

This light module 2 comprises optical deflection elements 6 for rays emitted by a light source 8 borne by a support 10. The optical deflection elements 6 are arranged about the axis of rotation 4 and they are driven in rotation by an actuator 12 about the axis of rotation 4 to transversely shift a corresponding light beam at the output of the light module 2.

The optical deflection elements 6 cooperate with the support 10 overlapping the light module 2, notably via rotation guiding elements 14 (that can be seen in FIGS. 1 and 2). It will be understood that the support 10 on the one hand bears the light source 8, which emits rays toward the optical deflection elements 6, and on the other hand bears a part of the elements 14 for guiding the optical deflection elements 6 in rotation about the axis of rotation 4. The optical deflection elements 6, which will be described in more detail hereinbelow, are arranged between the guiding elements 14 and the actuator 12 relative to their arrangement along the axis of rotation 4.

Control means (not represented here) drive the actuator 12. A movement is transmitted by this actuator 12 to an output shaft 16, which transmits to the optical deflection elements 6 the rotation movement commanded about the axis of rotation 4. As represented, the output shaft 16 is made to be secured to the optical deflection elements 6 at a first end 18, here considered as bottom end relative to the orientation defined previously.

The optical deflection elements 6 here consist of an elliptical or parabolic reflector, with a reflecting face 20 configured to reflect the light rays emitted by the light source 8, which is arranged substantially in the vicinity of a first focal point of the optical deflection elements 6. A light beam is thus generated to form a beam that is regulatory from the point of view of the lighting and/or signaling of a motor vehicle.

It will be noted that, without departing from the context of the invention, the optical deflection elements 6 can take different forms provided that they are driven in rotation by an actuator 12 at a first end relative to the axis of rotation 4 and that their arrangement relative to the light source makes it possible to form a regulatory beam.

In the vicinity of a second end 22 of the optical deflection elements 6, here the end designated top end according to the orientation described previously, that is to say at the end opposite the first end 18 where the actuator 12 extends, the rotation guiding elements 14 are arranged via which the optical deflection elements 6 cooperate with the support 10 and which will be described in more detail hereinbelow.

It will be understood that the arrangement of the rotation guiding elements 14 and of the driving means formed by the actuator 12 and the output shaft 16, on either side of the optical deflection elements 6, allows the optimal rotational guiding of the optical deflection elements about the axis of rotation.

The guiding elements 14 and the output shaft 16 make the optical deflection elements 6 capable of performing a rotation ranging up to 360 degrees about the axis of rotation 4, substantially vertical, without load on the actuator 12, and with great accuracy in the relative positioning of the optical deflection elements 6 and of the light source 8, advantageously centered on the axis of rotation 4.

The deflection elements 6 thus follow a rotational movement actuated by the actuator 12 and transmitted by the output shaft 16, this rotational movement being facilitated by the presence of the guiding elements 14.

Figure 3:
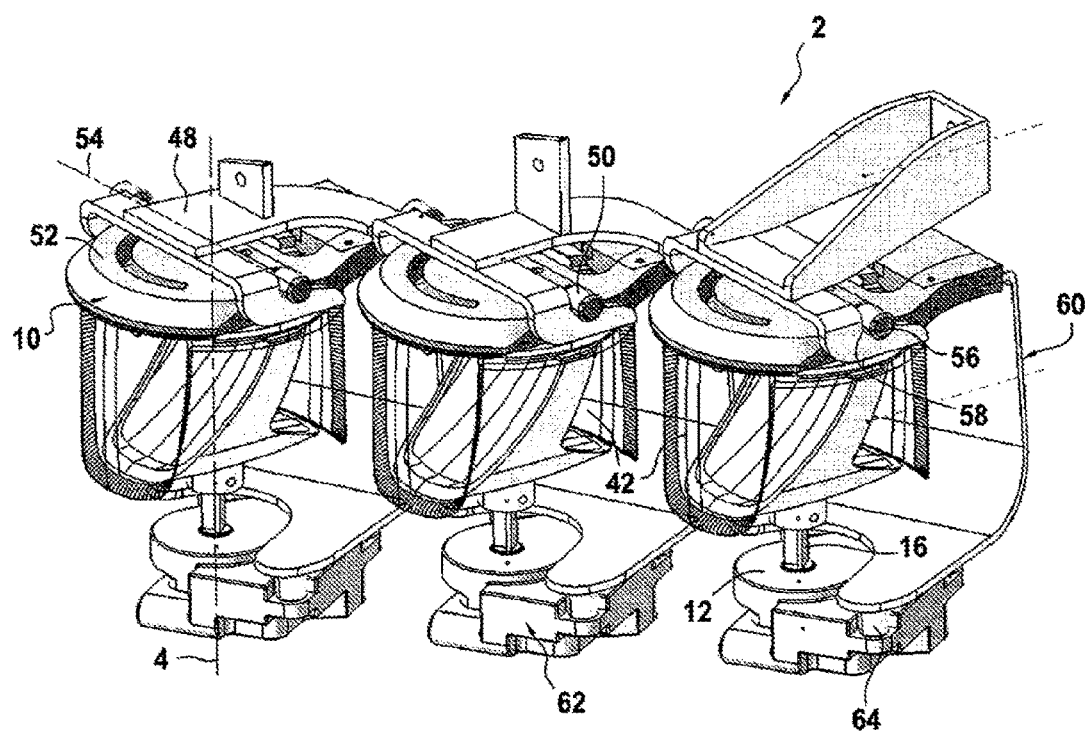
FIG. 3 is a three-quarters perspective view from the front of a lighting and/or signaling device comprising a set of three light modules according to the embodiment of the invention represented in FIGS. 1 and 2.

As represented in FIGS. 1 to 3, the support 10 comes to overlap the light module 2. It will be noted that the support 10 can form a heat sink produced in a heat-conducting metal material, notably in aluminum. According to the invention, the support on the one hand bears at least one light source and on the other hand bears a part of the rotation guiding elements 14.

Said rotation guiding elements 14 allow the optical deflection elements 6 to remain centered on the axis of rotation 4 and therefore allow the light source 8 to remain positioned substantially at the focal point of these optical deflection elements. These guiding elements 14 participate in the rotational guiding of the optical deflection elements 6, about the axis of rotation 4, here substantially vertical, in order to transversely shift the light beam at the output of the light module 2.

The rotation guiding elements 14 consist, according to the invention, of a first guiding element 24 borne by the support 10 and of a second guiding element 26 borne by the optical deflection elements 6.

The first guiding element 24 consists of a circular guiding track 27 here produced on the rim of a cylindrical boss 28 which extends to protrude from an inner face 30 of the support 10. The inner face of the support should be understood to be the face facing toward the optical deflection elements. The boss 28 has a cylindrical form, of circular section, and it has an annular peripheral face 32 which extends from the inner face 30 of the support 10, and which forms the circular guiding track, and a transverse end face 33, substantially parallel to the inner face 30 of the support 10. The cylindrical boss 28 has a determined height, said height corresponding to the dimension of the boss in the direction of the axis of rotation 4, and therefore to the offset between the transverse face 33 of the boss and the inner face 30 of the support. The annular cylindrical boss 28 is centered on the axis of rotation 4 and it bears, on its transverse end face 33, the light source 8. The presence of the cylindrical boss as support for the light source implies a staged arrangement in which the light source is offset axially, according to the axis of rotation, relative to the inner face 30 of the support 10. This staged arrangement allows the creation of a rotation guiding track on a flank of the cylindrical boss, which forms a support for the light source.

The second guiding element 26 consists of at least one pin 34 borne by the optical deflection elements 6 in the vicinity of the top end 22 of these optical deflection elements. Each pin 34 consists of a protuberance that can be made of a single piece with or added to the optical deflection elements 6, and the arrangement and the form of which make it capable of cooperating with the first guiding element 24 borne by the support 10, as is described above, and notably capable of cooperating with the annular peripheral face 32. Each pin 34 has a form of cylinder of revolution about an axis parallel to the axis of rotation 4, such that the generatrix of this pin is substantially parallel to the annular peripheral face 32 of the cylindrical boss.

At the top end 22 of the optical deflection elements, an arm 36 extends the reflecting face 20 substantially at right angles, by extending substantially parallel to the support 10. The arm 36 is more particularly an extension of a lateral flank 38 delimiting the reflecting face 20 of the optical deflection elements 6. As represented in FIGS. 1 and 2, the optical deflection elements 6 comprise, at the top end 22, two arms 36 extending the two opposite lateral flanks 38 of the optical deflection elements 6.

As is more clearly visible in FIG. 2, the second guiding element 26 advantageously comprises a plurality of pins 34, and it can notably comprise three pins arranged at a distance from one another on a circular arc of a radius slightly greater than that defined by the annular peripheral face 32 of the first guiding element 24, such that the pins can come into spot contact with the annular peripheral face 32, which forms a running tread against the pins.

The presence of three pins allows for efficient rotational guiding. In the example illustrated, two of the three pins 34 are diametrically opposite, on either side of the axis of rotation 4, and the third pin is situated on the circular arc of positioning of the pins, between these two diametrically opposite pins, with a separation angle of 90°. In a variant embodiment, the pins 34 could be arranged to be regularly distributed over the entire perimeter of the cylindrical boss 28 when the module is assembled, that is to say that the pins would have a mutual separation angle of 120°.

As can be seen in FIG. 2, two pins 34 are borne respectively by an arm 36 extending a lateral flank 38 delimiting the reflecting face 20 of the optical deflection elements 6. And the third pin is borne by an edge 39 extending the top end 22 of the optical deflection elements opposite the reflecting face. When all of the module is mounted, it will be understood that the first guiding element 24, and more particularly the annular peripheral face 32 of the cylindrical boss 28, forms a guiding track against which are added the pins 34 corresponding here to the second guiding element 26 (visible in FIGS. 1 and 2). When the optical deflection elements 6 are made rotationally mobile by the effect of the actuator 12, the pins borne by the top end 22 of the optical deflection elements 6 follow the rotational movement and the configuration of the pins, notably arranged on either side of the axis of rotation, means that they remain in contact with the cylindrical boss 28, which, for its part, remains fixed with the support. The pins are thus intended to follow the guiding track around the boss 28 and therefore to follow a circular trajectory.

It is important for the pins 34 to be in constant contact with the annular peripheral face 32 of the cylindrical boss 28, and it is therefore best to ensure that the heights of the pins and of the boss allow this contact, over a reach that is sufficiently great to avoid having the pins escape when the module is assembled.

The inner face 30 of the support extends from the cylindrical boss 28 in a transverse plane, at least toward the front of the vehicle when the light module 2 is fitted in the vehicle. This inner face bears at least one additional light source 40. It will be understood that the dimension of the inner face will have to allow the arrangement of this additional light source such that it can be shifted transversely relative to the axis of rotation.

Provision will be able to be made for the light module 2 to comprise a screen 42 (visible in FIG. 3) arranged facing this additional light source, as will be described hereinbelow.

The light source 8 and the additional light sources 40 can consist of semiconductor sources of light-emitting diode type. In this case, provision will be able to be made to have, on the end face 33 of the cylindrical boss, a first printed circuit board 44 bearing the light source 8, and, on the inner face 30 of the support 10, a second printed circuit board 46 bearing the additional light source or sources 40. In the example illustrated, these two printed circuit boards are in a staged arrangement, separated axially by the height of the guiding track formed by the annular peripheral face 32 of the cylindrical boss 28.

The light source 8 is substantially aligned on the axis of rotation 4. The expression "substantially aligned" should be understood to mean that the distance between the geometrical center of the light source such as a light-emitting diode and the axis of rotation 4 of the light module 2 is not greater than the dimensions of the light-emitting diode.

The light sources are fixed in the light module 2 and their emitted light rays are oriented away from the support 10. These light sources 8, 40 can have, in the light module 2, lighting and/or signaling functions that are distinct according to their locations and the control instructions according to the road conditions. Notably, the light source 8 is arranged to emit light rays toward the reflecting face 20 of the optical deflection elements 6, whereas the additional light source or sources are arranged to emit inside the translucent screen 42 participating in esthetic functions.

The light module according to the invention, as has just been described, participates in the formation of a lighting and/or signaling device, as illustrated in FIG. 3, inasmuch as it is arranged in a motor vehicle headlight housing (not represented) closed by a projection outer lens, so as to define a housing for the module or modules according to the invention. It will be understood that it will be possible to arrange a plurality of light modules as have just been described to form a lighting and/or signaling device. Note that it is advantageous for the two headlights, left and right, to comprise an equivalent device, with an equivalent number of light modules.

Each light module 2 is associated with a plate 48, or a plate portion 48, which overlaps the support 10. The plate 48 is fixed to the housing and is configured to position the support 10 relative to the headlight.

As represented in FIG. 3, the device comprises a single plate which covers all of the light modules 2 included in the housing, but it will be understood that each light module 2 can be associated with an individual plate, independent of the other plates.

Each of the three light modules 2 is rotationally mobile about an axis of rotation 4 which is specific to it, and in at least one of these light modules, this rotation is facilitated by elements 14 as have just been described. An axis of rotation 4 has been represented in FIG. 3 for one of the light modules 2, and advantageously, the axis of rotation 4 specific to each light module 2 is substantially parallel to the axis of rotation 4 of the neighboring light modules 2.

In the example of application illustrated, the support 10 has protuberances 50 protruding from an outer face 52 of the support 10, diametrically opposite, and aligned to form an additional axis of rotation 54 capable of cooperating with bearings which will be described hereinbelow. The protuberances 50 can consist of cylindrical pins.

It will be understood that these protuberances are produced here to form an axis of rotation distinct from a first axis of rotation as has been previously defined and about which the optical deflection elements are configured to rotate, via the actuator 12 and the rotation guiding elements 14. The additional axis of rotation 54 allows the light module 2 to pivot and to ensure a vertical movement of the light beam at the output of the light module 2.

Obviously, the optimal production of the rotation guiding function about the first axis of rotation by the elements 14 as have been described previously does not require the presence of these protuberances and of this second axis of rotation. It will be understood that the presence of these protuberances is optional. However, it is interesting to note that the implementation of this second rotational movement is facilitated by the very accurate rotational guidance about the first axis, since the rotation about the second axis would be difficult to implement if a cantilever effect were to occur in the production of the rotation about the first axis.

In the example of application illustrated, the plate 48 participates in the rotating of the light module or modules about the additional axis of rotation 54 which is specific to them. To this end, the plate 48 bears at least two reception lugs 56, made of a piece with or added to and made integral with the plate. For a given light module, two reception lugs 56 are arranged on either side of the module to form bearings for receiving elements protruding from the support 10, notably the protuberances 50, as described previously. The two reception lugs 56 are each in the form of a hook defining a groove 58 into which one of the protuberances 50 is inserted. The grooves 58 are arranged coaxially, and the arrangement of the reception lugs 56 and of the protuberances 50 defines the additional axis of rotation 54 for the light module 2, which, in this embodiment, is rotationally mobile according to two axes of rotation 4 and 54, distinct and non-parallel, and advantageously at right angles to one another.

In a given configuration, the axis of rotation 4 is substantially vertical and allows the horizontal rotation (in the left-right and right-left directions) of the light beam at the output of the corresponding light module 2, within the light device. The additional axis of rotation 54 is substantially horizontal and allows the vertical shifting (in the downward and upward directions) of the light beam at the output of the corresponding light module 2, within the light device.

As can be seen in FIG. 3, the light module 2 according to the invention can comprise a transparent screen 42 on the output path of the light beam from the light module 2. This screen 42 is arranged so as to receive the rays emitted by the additional light source or sources 40. The screen 42 is thus intended to produce a style effect when the additional light sources 40 are on, without hampering the formation of a regulatory beam when the light source 8 is on. It will be understood that the presence of a screen 42 here has only one additional function and that the light module could, as illustrated in FIGS. 1 to 3, not include such a screen facing the optical deflection elements 6.

The light module 2 further comprises a control device capable of formulating, on the basis of information received from vehicle state sensors, control instructions to be sent to the actuator 12 and to actuation means (not represented) responsible for the rotational movement about the additional axis of rotation 54. The instructions consist in driving the rotation of the light module 2 affecting the axis of rotation 4 and/or the additional axis of rotation 54.

The lighting function can then be directional, by virtue of the actuator 12 and of the actuation means specific to the rotational movement about the additional axis of rotation 54 of the light module 2. The rotational movements about the first axis of rotation 4 and about the additional axis of rotation 54 can be simultaneous and calibrated between the two axes or totally independent.

The simultaneous rotation is notably possible because of the driving of the actuator 12 in rotation with the light module 2 when the latter is driven in rotation about the additional axis of rotation 54. It will be understood that when the light module 2 is driven in rotation about the additional axis of rotation 54, the rotation according to the axis of rotation 4 is possible notably by virtue of a configuration provided for this purpose.

There now follows a description of the operation of the lighting and/or signaling device, and in particular a first mode in which the light beam at the output of the light module 2 is shifted transversely, and a second mode in which the light beam at the output of the light module is shifted vertically. These two modes of operation can operate simultaneously or alternately. The first mode of operation consists in the actuator 12 transmitting to the output shaft 16 a rotational movement, said output shaft 16 driving the optical deflection elements 6 in rotation about the axis of rotation 4, the rotation being guided according to a path defined by the configuration of the rotation guiding elements 14. The optical deflection elements 6 rotate about the axis of rotation 4 by an angle defined by the control instructions sent to the actuator, while the support 10 and the light sources that it bears remain fixed. A bracket support 60 is arranged between the support, to which it is secured at one of its ends, and a fixing support 62 for the actuator 12, to which it is secured via fixing means, here a screwing bush arranged between the bracket support and the fixing support, and passed through by a tightening screw that is not visible which fixes the bracket support onto the fixing support. This bracket support remains fixed during the rotation of the optical deflection elements about the axis of rotation 4. This rotation of the optical deflection elements about the axis of rotation 4 generates a shifting of the rays emitted by the light source 8 such that it is possible to generate a transverse movement of the beam at the output of the lighting and/or signaling device.

The second mode of operation consists in having the actuation means, not represented in FIG. 4, being capable of pushing on the bracket support 60 in its bottom part, away from the support.

This pushing on the bracket support 60 results in a pivoting of the module assembly about the additional axis of rotation 54. The protuberances 50 protruding from the support 10 rotate in the fixed bearings 56 borne by the plate 48. The bottom part of the bracket support pivots, driving, in its rotation about the additional axis of rotation 54, the fixing support 62 of the actuator 12, the actuator 12, the output shaft 16, the optical deflection elements 6, the rotation guiding elements 14 and the support 10. It will be understood that when the bracket support pivots, the support 10 is also driven in rotation about the second axis of rotation, which drives, in the same rotation, the rotation guiding elements 14, then the optical deflection elements and the actuator. All these components are thus taken as a single assembly secured in rotation about the additional axis of rotation 54 to produce a vertical shift of the light beam at the output of the light module 2.

The description above explains clearly how the invention makes it possible to achieve the objectives that it has set out and in particular to propose a light module 2 for lighting and/or signaling that is rotationally mobile according to at least one axis of rotation by virtue of the actuator 12, and without stress by virtue of the elements 14. According to the invention, the location of the elements 14 at an end of the optical deflection elements opposite the output shaft 16 and the actuator 12 makes it possible to hold the optical deflection elements 6 in the top part during the rotation and best adjust the position of the light source at the focal point of the optical deflection elements.

According to lighting control instructions for the light sources and according to the rotation control instructions for the light module 2, the invention allows the accurate rotational guiding of the light module 2 with the effect of producing different combinations of functions and of widening the lighting zone. It will be understood that the fact that the light module 2 is rotationally mobile transversely and vertically makes it possible to cover a large lighting and/or signaling zone while observing the bulk constraints of the light device.

Moreover, the invention allows, with the particular configuration of the elements 14, a stacking of the support 10 and of the different components of the elements 14, with the effect of advantageously offering a compact assembly with minimal play between the different parts of the light module 2, thus causing less vibrations and premature wear between the different components. The reliability of the rotational movement along the guiding track about the axis of rotation 4 of the light module 2 is then increased.

These advantages would also be obtained by one or more variant embodiments, and notably those which will be listed below, without this list however being exhaustive, it being understood that other variants not described could lie within the context of the invention, provided that mutually cooperating rotation guiding elements are provided on the optical deflection elements and on the support of the light source projecting rays onto these optical deflection elements.

In a first variant that is not represented, the circular guiding track 27 forming the first rotation guiding element can take the form of a groove hollowed out in the inner face 30 of the support 10, instead of the peripheral lateral face of the cylindrical boss as described previously. The pins borne by the optical deflection elements will be configured to be able to be housed in this groove and guided in rotation during the rotational movement of the optical deflection elements.

In another variant, also not represented here, it will be possible to provide for the cylindrical boss to be hollow, such that only an annular wall extends protruding from the inner face of the support, and it will be possible to provide, in this context, for the light source, as well as the first associated printed circuit board if appropriate, to be arranged inside this annular wall, bearing on the inner face 30 of the support 10. It would in this case also be possible to envisage having the pins 34 placed either in contact with an inner face of this annular wall or with an outer face as has been described previously.

Finally, it will be possible to provide an abutment arranged on the path of the pins 34 when they run along the guiding track. This abutment then makes it possible to limit the rotational movement of the optical deflection elements 6. This abutment will notably be able to be formed protruding from the inner face 30 of the support 10 and arranged against the annular peripheral face 32 of the cylindrical boss, when the circular guiding track is formed by the annular peripheral face of the boss.

In each of these variants which have just been described, just as in the embodiment presented previously, it will be possible to provide for the guiding track to be only partially circular, it being understood that the effective guiding part is formed by a circular arc. The light source is then arranged in the vicinity of the center of this circular arc defining the outline of the at least partially circular guiding track.

The invention claimed is:

1. A light module for a motor vehicle comprising
at least one light source that emits light rays,
at least one support bearing said light source,
at least one optical deflection element that deflects the light rays emitted by the at least one light source to form a light beam projected at an output of the light module,
guiding elements that guide the optical deflection element in rotation about an axis of rotation, in order to shift the projected light beam transversely,
wherein the guiding elements comprise a first guiding element borne by the support and which cooperates with a second guiding element borne by the optical deflection elements,
wherein the second guiding element comprises at least one pin secured to the optical deflection elements, and
wherein the at least one pin includes a smooth cylindrical outer surface.

2. The light module according to claim 1, wherein said optical deflection elements are rotationally mobile under an effect of an actuator.

3. The light module according to claim 2, wherein the actuator comprises an output shaft extending along the axis of rotation and bearing the optical deflection elements.

4. The light module according to claim 3, wherein the output shaft and the guiding elements are arranged on either side of the optical deflection elements along the axis of rotation.

5. The light module according to claim 1, wherein the at least one pin is borne by an arm, wherein the arm transversely extends from an end of the optical deflection elements that faces the support.

6. The light module according to claim 5, wherein the at least one pin has a form of revolution about an axis parallel to the axis of rotation.

7. The light module according to claim 1, wherein the first guiding element comprises a guiding track that is at least partially circular and against which the second guiding element can come to bear.

8. A light module for a motor vehicle comprising
at least one light source that emits light rays,
at least one support bearing said light source,
at least one optical deflection element that deflects the light rays emitted by the at least one light source to form a light beam projected at an output of the light module,
guiding elements that guide the optical deflection element in rotation about an axis of rotation, in order to shift the projected light beam transversely,
wherein the guiding elements comprise a first guiding element borne by the support and which cooperates with a second guiding element borne by the optical deflection elements
wherein the first guiding element comprises a guiding track that is at least partially circular and against which the second guiding element can come to bear, and
wherein the guiding track is formed at a periphery of a cylindrical boss arranged to protrude from an inner face of the support facing the optical deflection elements.

9. The light module according to claim 8, wherein the light source is arranged on a transverse end face of the cylindrical boss.

10. The light module according to claim 9, wherein the light source is arranged in a vicinity of a center of the circular arc defining an outline of the at least partially circular guiding track.

11. A light module for a motor vehicle comprising
at least one light source that emits light rays,
at least one support bearing said light source,
at least one optical deflection element that deflects the light rays emitted by the at least one light source to form a light beam projected at an output of the light module,
guiding elements that guide the optical deflection element in rotation about an axis of rotation, in order to shift the projected light beam transversely,
wherein the guiding elements comprise a first guiding element borne by the support and which cooperates with a second guiding element borne by the optical deflection elements
wherein the first guiding element comprises a guiding track that is at least partially circular and against which the second guiding element can come to bear, and
wherein the guiding track is formed by a face of an annular wall which extends to protrude from an inner face of the support and wherein the light source is arranged inside a perimeter of the guiding track.

12. The light module according to claim 11, wherein the optical deflection elements consist of a reflector of substantially elliptical form, the light source being arranged substantially in a vicinity of a first focal point of said reflector.

13. The light module according to claim 12, wherein the optical deflection elements are also mounted to be rotationally mobile about an additional axis of rotation distinct from said axis of rotation.

14. A light device for lighting and/or signaling for a motor vehicle comprising at least one of the light module according to claim 1.

15. The light module according to claim 2, wherein the second guiding element comprises at least one pin secured to the optical deflection elements.

16. The light module according to claim 2, wherein the first guiding element comprises a guiding track that is at least partially circular and against which the second guiding element can come to bear.

17. The light module according to claim 1, wherein the optical deflection elements consist of a reflector of substantially elliptical form, the light source being arranged substantially in the vicinity of a first focal point of said reflector.

18. The light module according to claim 1, wherein the optical deflection elements are also mounted to be rotationally mobile about an additional axis of rotation distinct from said axis of rotation.

19. A light device for lighting and/or signaling for a motor vehicle comprising at least one of the light module according claim 2.

* * * * *